(12) United States Patent
Rahman et al.

(10) Patent No.: US 8,129,880 B2
(45) Date of Patent: Mar. 6, 2012

(54) CONCENTRATED WINDING MACHINE WITH MAGNETIC SLOT WEDGES

(75) Inventors: Khwaja M. Rahman, Troy, MI (US); Edward L. Kaiser, Orion, MI (US); Matthew D. Laba, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 499 days.

(21) Appl. No.: 11/940,407

(22) Filed: Nov. 15, 2007

(65) Prior Publication Data

US 2009/0127942 A1    May 21, 2009

(51) Int. Cl.
H02K 3/48 (2006.01)

(52) U.S. Cl. ............. 310/214; 310/215; 310/254.1; 310/216.069

(58) Field of Classification Search .......... 310/214, 310/215, 254.1, 216.069
See application file for complete search history.

(56) References Cited

U.S. PATENT DOCUMENTS

| | | | |
|---|---|---|---|
| 2,636,137 A * | 4/1953 | Andrus | 310/87 |
| 2,710,931 A * | 6/1955 | Tittel et al. | 428/546 |
| 3,035,195 A * | 5/1962 | Welter et al. | 310/214 |
| 3,845,339 A | 10/1974 | Merkle | |
| 3,866,070 A * | 2/1975 | Madsen | 310/214 |
| 3,952,406 A * | 4/1976 | Madsen | 29/598 |
| 3,999,092 A | 12/1976 | Whiteley | |
| 4,149,101 A * | 4/1979 | Lesokhin et al. | 310/214 |
| 4,264,835 A | 4/1981 | Viewegh et al. | |
| 4,267,719 A * | 5/1981 | Walker | 72/122 |
| 4,319,152 A | 3/1982 | Van Gils | |
| 4,374,337 A * | 2/1983 | Kohzai et al. | 310/186 |
| 4,427,910 A * | 1/1984 | Richter et al. | 310/214 |
| 4,510,409 A | 4/1985 | Kanayama | |
| 4,578,610 A | 3/1986 | Kliman | |
| 4,584,497 A * | 4/1986 | Butman et al. | 310/214 |
| 4,644,202 A | 2/1987 | Kroy | |
| 4,719,377 A | 1/1988 | Horie | |
| 4,788,464 A | 11/1988 | Nishikawa | |
| 4,866,324 A | 9/1989 | Yuzawa | |

(Continued)

FOREIGN PATENT DOCUMENTS

DE   3517883   11/1985

(Continued)

OTHER PUBLICATIONS

Rasmussen, Peter Omand, "Structural Stator Spacers—A Solution for Noise Reduction of Switched Reluctance Motors," IEEE Transactions on Industry Applications, vol. 40, No. 2, Mar./Apr. 2004, pp. 574-581.

Libert, F., et al., "Manufacturing Methods of Stator Cores with Concentrated Windings," Royal Institute of Technology, Department of Electrical Machines and Power Electronics, Sweden, Published: 2006.

(Continued)

*Primary Examiner* — Quyen Leung
*Assistant Examiner* — Alex W Mok
(74) *Attorney, Agent, or Firm* — Ingrassia Fisher & Lorenz, P.C.

(57) ABSTRACT

Methods and apparatus are provided for improving operational characteristics of a concentrated winding machine. According to an example embodiment, an apparatus comprises stator teeth having distal ends, the stator teeth arranged in an annular fashion about an axis to define stator slots between adjacent teeth and slot openings between the distal ends of the adjacent teeth, the stator teeth structured to prevent relative movement between adjacent teeth. The apparatus further comprises magnetic wedges structured to be inserted between the distal ends of the adjacent teeth to close the slot openings.

15 Claims, 7 Drawing Sheets

U.S. PATENT DOCUMENTS

| | | | |
|---|---|---|---|
| 5,093,597 | A | 3/1992 | Hughes |
| 5,272,938 | A | 12/1993 | Hsu |
| 5,744,896 | A | 4/1998 | Kessinger |
| 5,753,991 | A | 5/1998 | Couture |
| 5,831,365 | A | 11/1998 | Keim |
| 5,866,959 | A * | 2/1999 | Le Flem .......................... 310/51 |
| 5,925,947 | A | 7/1999 | Kajiwara |
| 6,011,337 | A | 1/2000 | Lim |
| 6,234,767 | B1 | 5/2001 | Takeda |
| 6,331,745 | B2 | 12/2001 | Blakelock et al. |
| 6,441,530 | B1 | 8/2002 | Petersen |
| 6,445,105 | B1 | 9/2002 | Kliman |
| 6,472,789 | B1 | 10/2002 | Akemakou |
| 6,674,201 | B2 | 1/2004 | Liu |
| 6,700,283 | B2 * | 3/2004 | Kikuchi et al. ............... 310/214 |
| 6,703,742 | B1 | 3/2004 | Brandley |
| 6,710,494 | B2 | 3/2004 | Hatz |
| 6,720,688 | B1 | 4/2004 | Schiller |
| 6,727,632 | B2 | 4/2004 | Kusase |
| 6,756,716 | B2 | 6/2004 | Siems et al. |
| 6,768,932 | B2 | 7/2004 | Claypole et al. |
| 6,830,117 | B2 | 12/2004 | Chernoff |
| 6,844,653 | B2 | 1/2005 | Kolomeitsev et al. |
| 6,844,656 | B1 | 1/2005 | Larsen et al. |
| 6,924,574 | B2 | 8/2005 | Qu et al. |
| 7,262,536 | B2 | 8/2007 | Rahman |
| 2002/0074871 | A1 * | 6/2002 | Kikuchi et al. .................. 310/58 |
| 2002/0074889 | A1 * | 6/2002 | Kikuchi et al. ............... 310/214 |
| 2002/0130581 | A1 * | 9/2002 | Arai et al. ...................... 310/215 |
| 2002/0175589 | A1 * | 11/2002 | Takizawa et al. ............. 310/180 |
| 2003/0132584 | A1 | 7/2003 | Borroni-Bird |
| 2003/0168925 | A1 | 9/2003 | Bernreuther |
| 2003/0193260 | A1 * | 10/2003 | Reiter et al. .................. 310/217 |
| 2004/0155548 | A1 | 8/2004 | Rasmussen |
| 2005/0004492 | A1 | 1/2005 | Burbank |
| 2005/0035678 | A1 * | 2/2005 | Ward et al. ............... 310/156.37 |
| 2005/0212379 | A1 * | 9/2005 | Kaminski et al. ............. 310/261 |

FOREIGN PATENT DOCUMENTS

| | | | |
|---|---|---|---|
| DE | 29816561 | | 2/1999 |
| DE | 69604537 | | 10/1999 |
| DE | 69610423 | | 9/2000 |
| DE | 69903187 | | 9/2002 |
| DE | 10152151 | | 5/2003 |
| DE | 69825386 | | 8/2004 |
| EP | 68727 | A1 * | 1/1983 |
| EP | 0533359 | | 8/1992 |
| FR | 2559967 | A1 * | 8/1985 |
| GB | 2159342 | | 11/1985 |
| GB | 2303499 | A * | 2/1997 |
| JP | 55144747 | A * | 11/1980 |
| JP | 56035647 | A * | 4/1981 |
| JP | 56136148 | A * | 10/1981 |
| JP | 56145741 | A * | 11/1981 |
| JP | 59136040 | A * | 8/1984 |
| JP | 60051427 | A * | 3/1985 |
| JP | 07154949 | A * | 6/1995 |
| JP | 07245896 | A * | 9/1995 |
| JP | 08340653 | A * | 12/1996 |
| JP | 2005192339 | A * | 7/2005 |
| WO | WO 9638902 | | 12/1996 |

OTHER PUBLICATIONS

Magnussen, F. et al., "Winding Factors and Joule Loses of Permanent Magnet Machines with Concentrated Windings," Royal Institute of Technology, Department of Electrical Engineering, Sweden, Published: 2003.

Salminen, D. S. P., et al., "Torque Ripple of Permanent Magnet Machines with Concentrated Windings," ISEF 2005—XII International Symposium on Electromagnetic Fields in Mechatronics, Electrical and Electronic Engineering, Baiona, Spain, Sep. 15-17, 2004.

U.S. Appl. No. 11/852,269, Patel.

U.S. Appl. No. 11/852,273, Ward.

U.S. Appl. No. 11/845,469, Rahman.

Caricchi et al, "Low-Cost Compact PM Machine for Adjustable-Speed Pump Application," Industry Applications Conference, Thirty-First IAS Annual Meeting, Conference Record of the 1996 IEEE, vol. 1, pp. 464-470.

Caricchi et al., "Experimental Study on Reducing Cogging Torque and No-Load Power Loss in Axial-Flux Permanent-Magnet Machines with Slotted Winding," IEEE, Jun. 2004, pp. 1066-1075.

Caricchi et al., "Experimental Study on Reducing Cogging Torque and Core Power Loss in Axial-Flux Permanent-Magnet Machines with Slotted Winding," IEEE, Jul. 2002, pp. 1295-1302.

Caricchi et al., "Experimental Study of a Bidrectional DC-DC Converter for the DC Link Voltage Control and the Regenerative Braking in PM Motor Drives Devoted to Electrical Vehicles," IEEE, May 1994, pp. 381-386.

Caricchi et al., "Design and Construction of a Wheel-Directly-Coupled Axial-Flux PM Motor Prototype for EVs," IEEE, Jan. 1994, pp. 254-261.

Caricchi et al., "Prototype of Innovative Wheel Direct Drive with Water-Cooled Axial-Flux PM Motor for Electric Vehicle Applications," Applied Power Electronics Conference and Exposition, 1996, vol. 2, pp. 764-770.

Caricchi et al., "20kW Water-Cooled Prototype of a Buck-Boost Bidirectional DC-DC Converter Topology for Electrical Vehicle Motor Drives," IEEE, 1995, pp. 887-892.

Caricchi et al., "Compact Wheel Direct Drive for EVs," IEEE Industry Applications Magazine, Nov./Dec. 1996, pp. 25-32.

Caricchi et al., "A Novel Solid-State-Commutator PM Motor Arrangement for EV Application," IEEE, 1999, pp. 2545-2551.

Caricchi et al., "Modular Axial-Flux Permanent-Magnet Motor for Ship Propulsion Drives," IEEE Transactions on Energy Conversion, vol. 14, No. 3, Sep. 1999, pp. 673-679.

Caricchi et al., "Multi-Stage Axial-Flux PM Machine for Wheel Direct Drive," Industry Applications Conference, 1995, Thirtieth IAS Annual Meeting, Conference Record of the 1995 IEEE, vol. 1, pp. 679-684.

Caricchi et al., "Performance of Coreless-Winding Axial Flux Permanent-Magnet Generator with Power Output at 400 Hz, 3000 r/min," Industry Applications, IEEE, 1998, vol. 34, pp. 1263-1269.

Honorati et al., "Lightweight, Compact, Three-Wheel Electric Vehicle for Urban Mobility," IEEE, Jun. 1998, pp. 797-802.

Periodic Table, Chemicool.com, 2005.

Rahman et al., "Application of Direct Drive Wheel Motor for Fuel Cell Electric and Hybrid Electric Vehicle Propulsion System," IEEE, May 2004, pp. 1420-1426.

Muljadi et al., "Axial Flux, Modular, Permanent-Magnet Generator with a Toriodal Winding for Wind Turbine Applications," IEEE Industry Applications Conference, Jul. 1998.

Cirani et al., "Analysis of an Innovative Design for an Axial Flux Torus Machine," Division of Electrical Machines and Power Electronics, Royal Institute of Technology, Stockholm, Sweden.

Caricchi et al. "Converter Topology with Load-Neutral Modulation for Trapezoidal-EMF PM Motor Drives" IEEE Transaction on Power Electronics, vol. 9, No. 2 Mar. 1994, 232-239.

Caricchi et al. "Prototype of Electric Vehicle Drive with Twin Water-Cooled Wheel Direct Drive Motors" IEEE 1996, 1926-1932.

Solero et al. "Nonconventional Three-Wheel Electric Vehicle for Urban Mobility" IEEE Jul., 2001, 1085-1091.

Li et al. "Reductions of Cogging Torque in Permanent Magnet Motors" IEEE Transactions on Magnetics Nov., 1988, 2901-2903.

Caricchi et al., Basic Principle and Design Criteria of Axial-Flux PM Machines Having Counter-Rotating Rotors, IEEE 1994, 247-253.

Carricchi, F. et al. "Three-Wheeled Electric Maxi-Scooter for Improved Driving Performances in Large Urban Areas," IEEE, Feb. 3, 2003, pp. 1363-1368.

Huang, S. et al. "TORUS Concept Machines: Pre-Prototyping Design Assessment for Two Major Topologies," Industry Applications Conference, Thirty-Sixth IAS Annual Meeting, Conference Record of the 2001 IEEE (2001), vol. 3: 1619-1625.

Letter dated Dec. 1, 2006 from Raja Saliba at Sughrue Mion, PLLC to Christopher DeVries at General Motors Corporation.

* cited by examiner

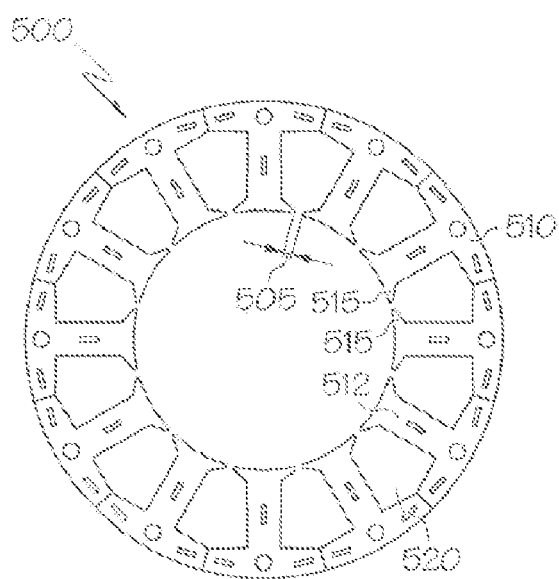
FIG. 1
(CONVENTIONAL)
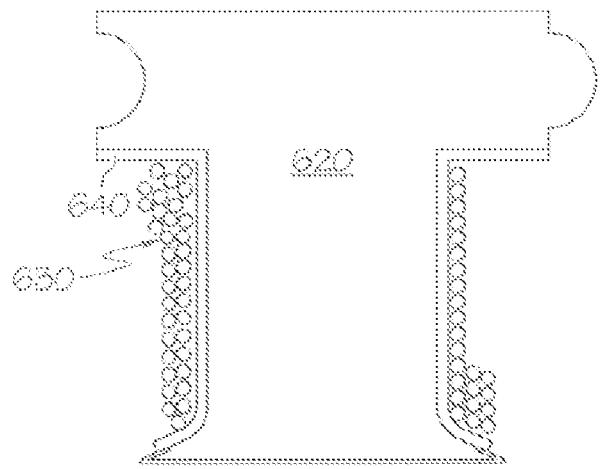
FIG. 2
(CONVENTIONAL)
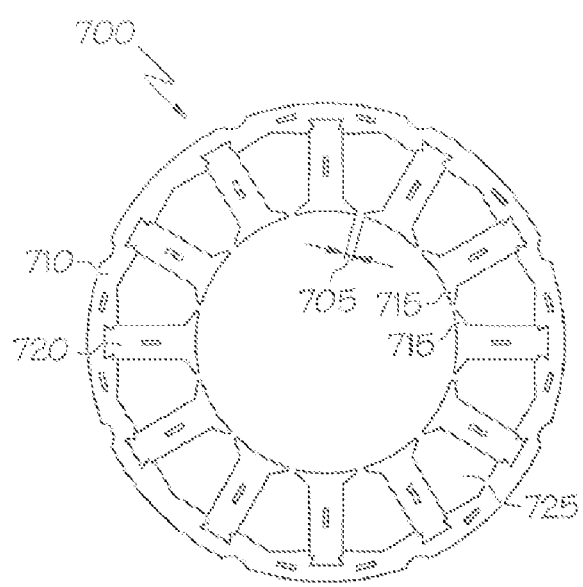
FIG. 3
(CONVENTIONAL)

CONCENTRATED WINDING MACHINE WITH MAGNETIC SLOT WEDGES

CROSS REFERENCE TO RELATED APPLICATIONS

This application is related to U.S. patent application Ser. No. 11/749,802 filed May 17, 2007, entitled "Concentrated Winding Machine with Magnetic Slot Wedges," which is hereby incorporated by reference in its entirety.

TECHNICAL FIELD

This disclosure relates generally to electrical machines, and more particularly relates to concentrated winding machines.

BACKGROUND OF THE INVENTION

An electrical machine may have distributed windings or concentrated windings, the difference between these windings being well known to those of ordinary skill. In a concentrated winding machine, a stator may be constructed in segments, which are then connected to form the entire stator. This is illustrated in FIG. 1, which is a sectional diagram illustrating a conventional segmented stator 500 that is composed of a number of stator segments 510. Each stator segment includes an integral tooth 512 and teeth tips 515. The teeth 512 define stator slots 520 that lie between adjacent teeth. Each stator segment 510 is in contact with an adjacent stator segment 510 at one radial end, while at the other radial end the teeth tips 515 of the teeth 512 are separated by a distance 505. The distance 505 may also be referred to as a slot opening.

Conventional stator designs include fixed-tooth stators and loose-tooth stators. For purposes of this disclosure, a fixed-tooth stator is defined as a stator that does not allow for the movement of stator teeth with respect to one another. The segmented stator 500 may be referred to as a fixed-tooth stator because the stator 500 is assembled such that the individual stator segments 510 are joined in a way that does not allow stator teeth 512 to move relative to one another. Conversely, loose-tooth stators allow for the movement of stator teeth with respect to one another. Examples of loose-tooth stators may be found in U.S. Pat. No. 6,844,653 to Kolomeitsev et al., issued Jan. 18, 2005, entitled "Stator design for permanent magnet motor with combination slot wedge and tooth locator," which is incorporated by reference.

Before the segmented stator 500 is assembled, the individual coils that are wrapped around each stator segment 510 are formed by winding around a bobbin, which is typically made of plastic. The plastic bobbin functions as a slot liner that isolates the winding from the stator lamination (iron). FIG. 2 is a sectional diagram illustrating a conventional stator segment 620 having a coil 630 wrapped around a plastic bobbin 640.

A disadvantage to using the plastic bobbin 640 as a slot liner is that it reduces the slot fill. That is, because the plastic is relatively thick, it decreases the volume in the stator slot that could otherwise be occupied by turns of the coil 630. Although paper insulation slot liners are thinner than plastic slot liners, paper insulation slot liners cannot be used in conventional segmented stator construction because bobbin style winding is not possible as the paper is often twisted or cut as the coil is wound around the paper. Also by filling the slot with more copper (thicker conductor), copper loss can be reduced. Reduced copper loss enables improved thermal performance of the machine.

To solve this problem of segmented stator construction, stator teeth can be inserted in a continuous stator back ring. FIG. 3 is a sectional diagram illustrating another conventional fixed-tooth stator 700 that is constructed by inserting stator teeth 720 in a continuous stator back ring 710. Like the stator teeth 512 of FIG. 1, the stator teeth 720 define stator slots 725 between adjacent teeth, and the stator teeth have teeth tips 715 that define a small gap or slot opening 705. In this construction method the coil is wound separately from a stator tooth 720. Afterwards, a paper insulation slot liner may be placed around the teeth, and then coil is slid over the end of the stator teeth 720 that do not have the teeth tips 715. Afterwards, the same end of the stator tooth 720 (the one without the teeth tips 715) is inserted in a corresponding slot on the stator back ring 710 to form the stator.

However, a disadvantage to the method of stator construction illustrated in FIG. 3 is that it weakens the stator mechanical structure and lowers its stiffness. Therefore, compared to the segmented stator construction method illustrated by FIG. 1, this method is more susceptible to undesirable vibration and noise.

Accordingly, it is desirable to have a fixed tooth stator that can take advantage of paper slot liners to increase slot fill. In addition, it is desirable to have a fixed tooth stator with increased stiffness. Furthermore, other desirable features and characteristics of the present invention will become apparent from the subsequent detailed description and the appended claims, taken in conjunction with the accompanying drawings and the foregoing technical field and background.

SUMMARY OF THE INVENTION

An apparatus is provided for improving operational characteristics of a concentrated winding machine. The apparatus comprises a fixed-tooth stator that includes stator teeth arranged in an annular fashion about an axis to define stator slots between adjacent stator teeth, the stator slots having slot openings between the ends of the stator teeth. The apparatus includes conductive windings that form coils around the stator teeth and that occupy a portion of the slot openings, and magnetic wedges joined to the ends of the stator teeth to cover the slot openings.

A method is provided for improving operational characteristics of a concentrated winding machine. The method comprises fabricating a fixed-tooth stator that has stator teeth, the stator teeth defining stator slots and slot openings between adjacent stator teeth, the fixed-tooth stator not allowing for relative movement between adjacent stator teeth. The method further comprises inserting magnetic wedges between adjacent stator teeth to close the slot openings.

DESCRIPTION OF THE DRAWINGS

The present invention will hereinafter be described in conjunction with the following drawing figures, wherein like numerals denote like elements, and FIG. 1 is a sectional diagram illustrating a conventional stator composed of a number of stator segments;

FIG. 2 is a sectional diagram illustrating a conventional stator segment having a coil wrapped around a plastic bobbin;

FIG. 3 is a sectional diagram illustrating a conventional stator that is constructed by inserting stator teeth in a continuous stator back ring;

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 4:
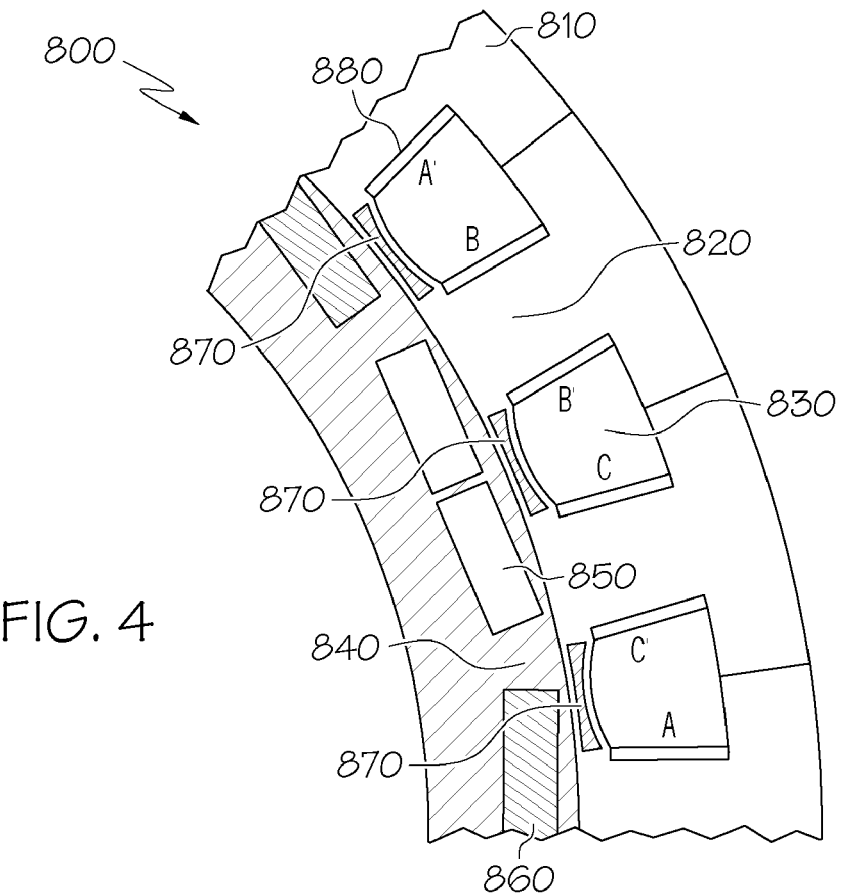
FIG. 4 is a diagram illustrating a 24-16 geometry for a concentrated winding machine in accordance with an example embodiment.

FIG. 4 is a sectional diagram illustrating the arrangement of the stator slots and rotor poles in a portion 800 of a concentrated winding machine in accordance with an example embodiment. The portion 800 illustrated in FIG. 4 has a periodicity of 8, that is, only $1/8^{th}$ of the complete geometry is shown in the diagram.

In portion 800, fixed-tooth stator segments 810 each have a stator tooth 820, where stator slots 830 are defined between adjacent stator teeth 820. Also shown in portion 800 are a rotor 840, north rotor poles 850, and south rotor poles 860. In total, there are twenty-four stator slots 830 and sixteen rotor poles 850, 860, resulting in a slot-to-pole ratio of 1.5. For convenience, the geometry of FIG. 4 may be referred to as a 24-16 geometry. It should be emphasized that the 24-16 geometry is merely an example; alternative embodiments may have different numbers of slots and poles that result in a different slot-to-pole ratio.

Figure 8:
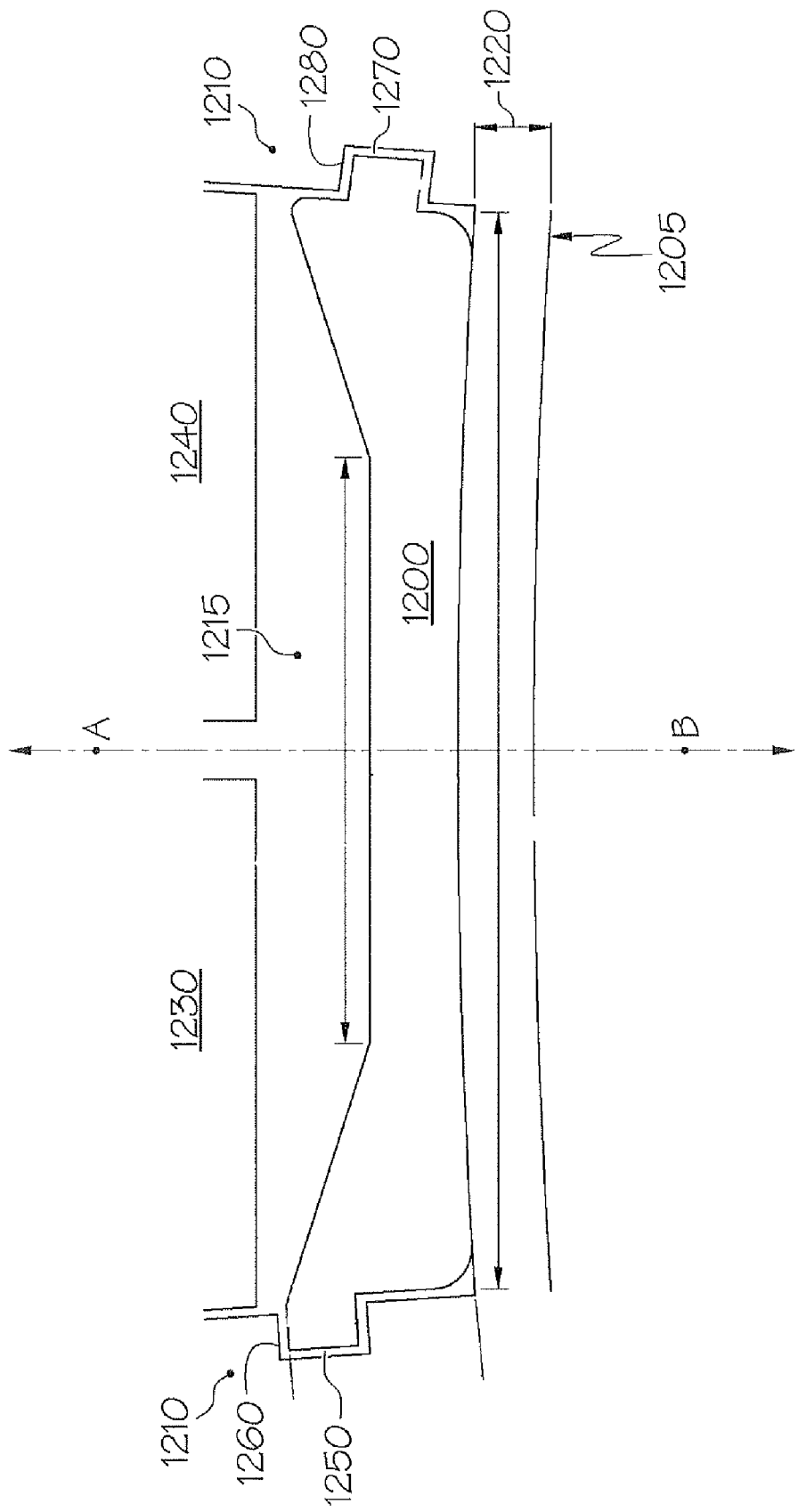
FIG. 8 is a sectional diagram that further illustrates a magnetic stator slot wedge and its relationship to the stator teeth and the rotor in accordance with an example embodiment.

According to the example embodiment illustrated in FIG. 4, the stator segments 810 together form an annular stator yoke and the stator teeth 820 extend from an edge of the annular stator yoke to define stator slots 830 between adjacent stator teeth and slot openings at distal ends of the stator teeth. The concentrated winding machine further includes three phase windings A, B, C that form coils around the stator teeth 820 and that occupy a portion of the stator slots 830. As illustrated, each of the windings A, B, C has a positive coil-side and a negative coil-side, the negative coil-side indicated by the prime symbol (e.g., the negative coil-side of the phase A winding in indicated by A'). A relatively thin paper slot liner 880 is disposed around the slot, insulating the stator lamination (iron) from the windings A, B, C. FIG. 8 illustrates a common configuration where the stator segments 810 surround a rotor 840 that rotates on a shaft (not shown). However, it should be kept in mind that the inventive aspects of the example embodiment may also be applied to so-called "inside-out" designs where the rotor rotates around the stator.

Figure 5:
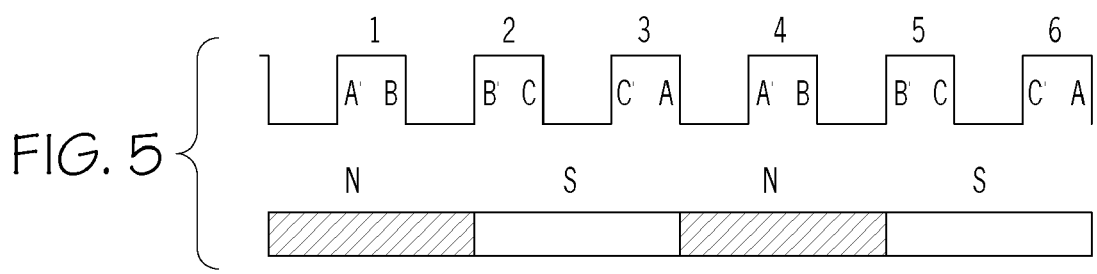
FIG. 5 is a diagram that illustrates the winding distribution of the 24-16 geometry of FIG. 8.

FIG. 5 is a diagram that illustrates the winding distribution for the 24-16 geometry of FIG. 4. In FIG. 5, six numbered slots are illustrated, representing one fourth of the complete 24-16 geometry. As can be seen in FIG. 4, there are two windings in each of the stator slots 830, where the phase of each winding is referred to with the letters A, B, C, and where the positive and negative coil-sides of each winding is indicated by the absence or presence of the "prime" symbol. That is, A', B', and C' are all indicative of the negative coil-side. Thus, the stator 800 of FIG. 4 has double-layer concentrated windings. The bottom half of FIG. 5 illustrates the relationship of the rotor poles 850, 860 of FIG. 4 relative to the windings. For each of the phase windings A, B, C of FIG. 5, the relative magnitude and phase difference among the phase windings is as follows: Phase A: [0.866, −30], Phase B: [0.866, 90], Phase C: [0.866, 210]. The cogging frequency in the arrangement illustrated in FIG. 4 and FIG. 5 is 48 times the rotor mechanical frequency. Of course, other embodiments may exhibit different magnitudes, phases, and cogging frequencies.

According to the example embodiment, the portion 800 further includes magnetic wedges 870 joined to the distal ends of adjacent stator teeth 820 to close the slot openings of the stator slots 830. Compared to conventional fixed-tooth stator designs such as those illustrated in FIG. 1 and FIG. 3, the example embodiment lacks teeth tips 515 or 715. In the segmented stator 500 of FIG. 1, the presence of teeth tips 515 means that the individual stator segments 510 are separately bobbin-wrapped with a plastic bobbin to form the coils, as was described above. But according to the example embodiment, the stator segments 810 may be assembled to form the stator and thereafter the coils, which have been wound separately, may be slipped over the end of the stator teeth 820 along with a paper slot liner. The magnetic wedges 870 may then be joined to the stator teeth 820 after the coils and slot liners have been arranged on the stator teeth 820. Thus, according to the example embodiment, it is possible to achieve the stiffer mechanical construction offered by a fixed-tooth segmented stator, as well as increase the slot fill by using a thinner paper slot liner.

According to the example embodiment, the presence of the magnetic wedges 870 also improves physical characteristics of the electrical machine. This is explained in further detail in the following paragraphs, which contain terms such as slotting effect, noise, vibration, cogging torque, torque ripple, leakage flux, eddy current, core loss, and spin loss. These terms refer to undesirable physical phenomena that may be present, in varying degrees, in electrical machines. Other terms such as reluctance, permeability, and rotor skew are also used. Since the meanings associated with these terms are well-known to those of skill in the art, a complete and thorough description of these terms is omitted for the sake of brevity, and cursory descriptions of these terms may instead appear.

Generally speaking, there is a slotting effect that arises due to the presence of slots and slot openings in the stator, such as the slots 520 and slot openings 505 of FIG. 1, which have a lower magnetic permeability relative to the stator teeth material, which is typically iron. As explained above, the example embodiment illustrated in FIG. 4 does not have teeth tips, which allows the winding to be wound outside and then slid onto the teeth. However, the elimination of the teeth tips means the slot openings of the slots 830 (FIG. 4) are wider than the slot openings 505 for the conventional stator of FIG. 1. Increasing the width of the slot opening generally results in an increased slotting effect.

Two of the primary manifestations of the slotting effect are cogging torque and torque ripple. Cogging torque is produced from the physical structure of the machine, e.g., the magnetic attraction between the rotor-mounted magnets and the stator teeth. Cogging torque is an undesirable effect that contributes to torque ripple, vibration, and noise in the machine. The cogging torque can be physically felt if one attempts to manually turn the rotor of a small machine within a stator—in some positions the rotor will turn relatively easily, while in others there will be a noticeably increased resistance to the applied torque. On the other hand, torque ripple is produced from the harmonic content of the current and voltage waveforms in the machine. Torque ripple can be produced by the same slotting effect but at the presence of the winding current. The latter effect usually the major source of torque ripple in most machines.

According to the example embodiment, the magnetic wedges 870 are positioned across the slot opening to reduce the slotting effect. That is, the permeability of the selected wedge material is preferably high enough such that the reluctance of the magnetic field near the slot opening is reduced, thus lowering the slotting effect.

Figure 6:
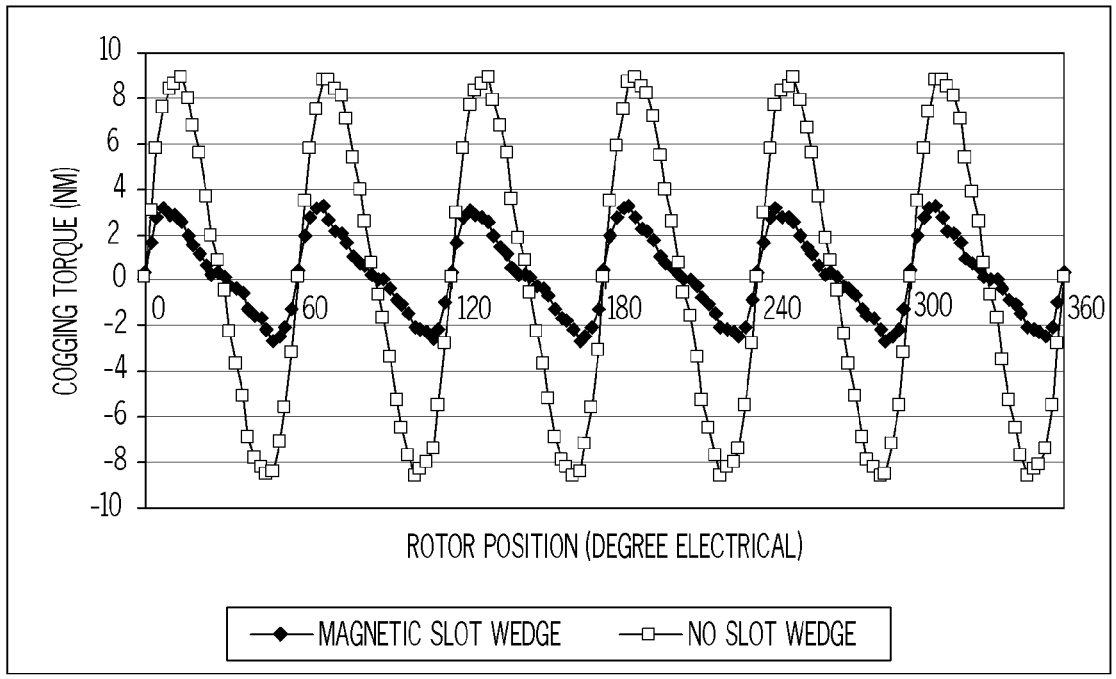
FIG. 6 is a graph comparing the cogging torque as a function of rotor position for a concentrated winding machine having magnetic wedges in accordance with the example embodiment and for a conventional concentrated winding machine that has teeth tips like the conventional design illustrated in FIG. 5.
Figure 10:
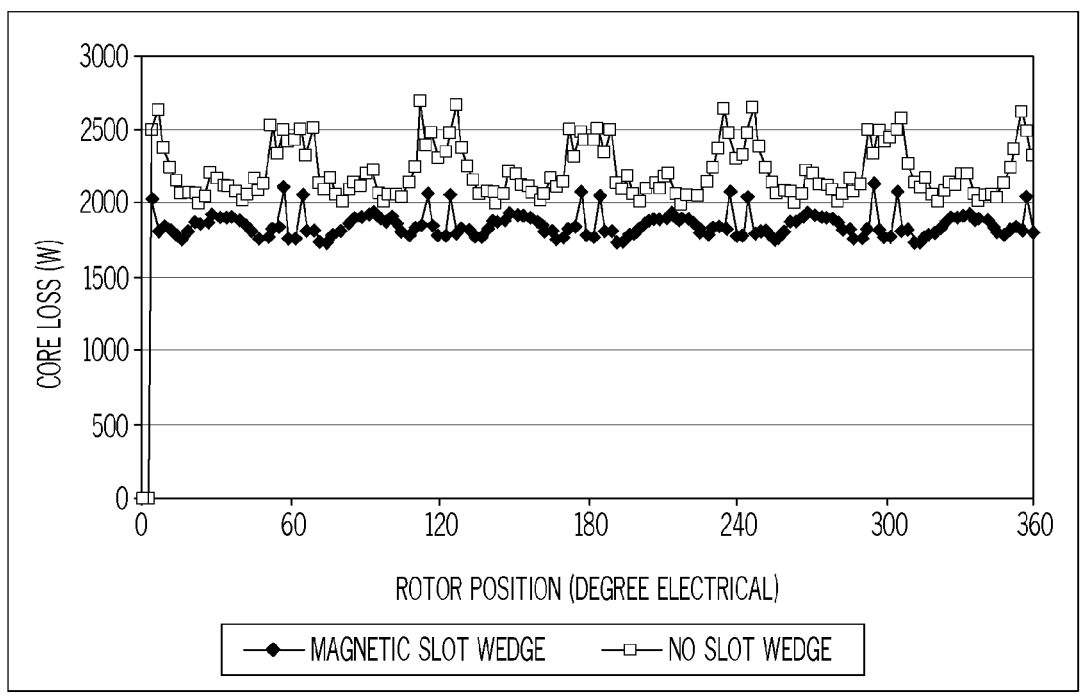
FIG. 10 is a graph that illustrates the core loss as a function of rotor position for an electrical machine having a conventional stator design and an electrical machine having a stator with magnetic wedges in accordance with the example embodiment.

FIG. 6 is a graph illustrating the cogging torque as a function of rotor position for a 24-16 concentrated winding machine having magnetic wedges in accordance with the example embodiment and for a conventional 24-16 stator concentrated winding machine that has teeth tips, like the conventional design illustrated in FIG. 1. As shown in FIG. 10, the peak-to-peak cogging torque is reduced from 18 Newton meters (Nm) to 5 Nm after the introduction of the magnetic wedges.

Figure 7:
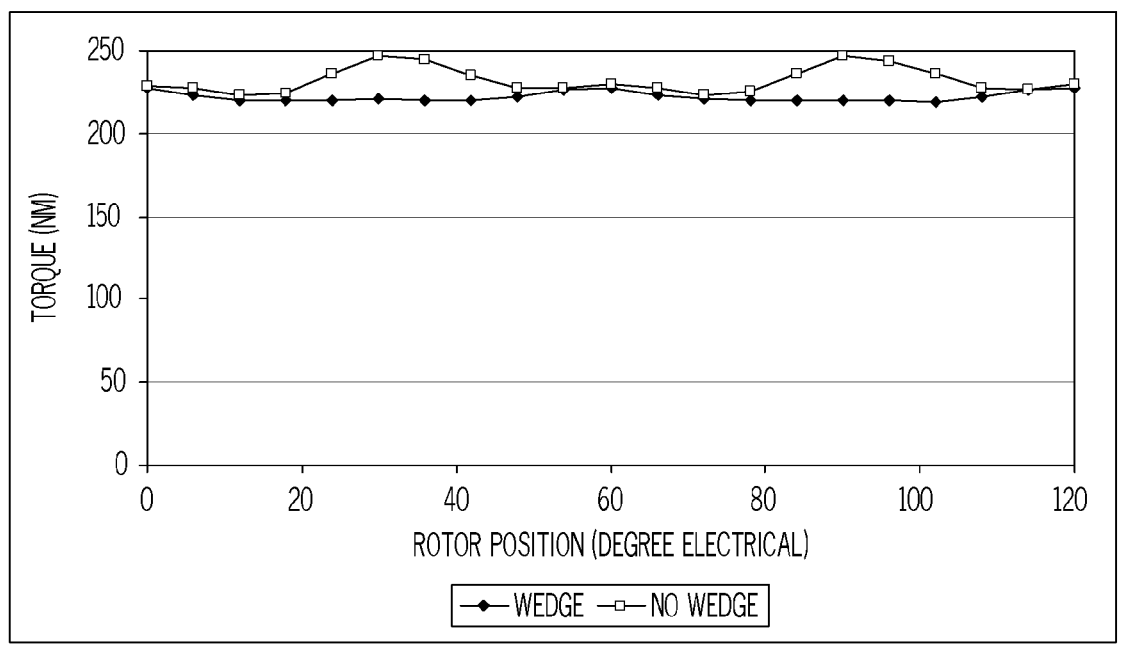
FIG. 7 is a graph comparing the machine torque as a function of rotor position for a 24-16 fixed-tooth stator concentrated winding machine having magnetic wedges in accordance with the example embodiment and for a conventional 24-16 fixed-tooth stator concentrated winding machine that has teeth tips like the conventional design illustrated in FIG. 5.

FIG. 7 is a graph illustrating the machine torque as a function of rotor position for a 24-16 concentrated winding machine having magnetic wedges in accordance with the example embodiment and for a conventional 24-16 concentrated winding machine that has teeth tips and no magnetic wedges, like the conventional design with teeth tips 515 illustrated in FIG. 1. In the conventional design, the average torque is 232 Nm while the peak-to-peak torque ripple is 24 Nm, or about 10.3% of the average torque. The average torque of the geometry with the magnetic wedge is 223 Nm, a reduction of roughly 4% compared to the conventional design, while the peak-to-peak torque ripple is reduced to only 8.5 Nm, or about 3.8% of the average torque. Thus, while the average torque produced by the example embodiment is slightly less compared to the conventional design, there is a significant improvement in the torque ripple.

FIG. 7 is also illustrative of an additional advantage of the magnetic wedges 870, which is related to noise. Noise performance is also an important design consideration for electrical motors. As was indicated above, the 24-16 geometry of FIG. 4 has a slot-to-pole ratio of 1.5. Generally speaking, this specific ratio of stator slots to rotor poles ensures a favorable radial force distribution. Since the radial force is a major source of noise, the ratio of 1.5 is also known as one that reduces machine noise, but it is unfortunately also a ratio that is associated with an increased torque ripple. A conventional method of reducing the unwanted torque ripple is to skew the rotor. However, rotor skewing increases the manufacturing cost and also reduces the machine torque by roughly 4% or greater. It should be noted that in FIG. 7, the significant improvement to the torque ripple achieved by the example embodiment is attainable without any skewing of the rotor, and the reduction in the average torque is less than what is typically achieved through conventional rotor skewing.

Based on the results illustrated in FIGS. 6 and 7, it can be seen that the magnetic wedges 870 significantly reduce the repercussions of the slotting effect by reducing both the cogging torque and the torque ripple. Additionally, according to the example embodiment, the permeability of the magnetic material used in the magnetic wedges 870 is also preferably low enough to reduce the amount of leakage flux. That is, the permeability of the selected wedge material should also be lower than the permeability of the stator and rotor material in order to reduce the amount of leakage flux that would otherwise lower the machine torque.

Thus, according to the example embodiment, the permeability of the magnetic wedges 870 is carefully selected such that it is high enough to reduce the slotting effect, but low enough to also reduce the amount of leakage flux. Powdered metal core type material such as Somoloy 500 manufactured by Hoganas AB of Hoganas, Sweden is one possible choice for the material of the magnetic wedge 870.

Although it is desirable to use a magnetic wedge 870 having a permeability that is lower than the steel of the stator for the reasons explained above, alternative embodiments may use wedge material that has a comparable or even higher permeability than the stator material. In the latter case, the leakage may increase, thereby lowering the machine torque, but all other advantages would still be achieved.

FIG. 8 is a sectional diagram that further illustrates a magnetic stator slot wedge 1200 and its relationship to the stator teeth 1210 and the rotor 1205 in accordance with an example embodiment. The magnetic stator slot wedge 1200 is shown in position across the slot opening of the stator slot 1215, between two adjacent stator teeth 1210. The stator slot wedge 1200 is disposed at a distance 1220 from the surface of the rotor 1205. This distance is typically close to the airgap between the rotor and the stator. Two windings 1230, 1240 are also shown occupying the stator slot 1215. Protrusions 1250, 1270 on the edges of the stator slot wedge 1200 correspond to grooves 1260, 1280, respectively on the edges of the stator teeth 1210. The grooves 1260, 1280 are used to join the magnetic stator wedge 1200 to the stator teeth 1210. The grooves 1260, 1280 may be cut into the stator teeth 1210 or alternatively, formed at the same time as the stator teeth 1210 (e.g., punched lamination).

FIG. 8 illustrates that according to the example embodiment, the protrusion 1250 and its corresponding groove 1260 are radially offset from the protrusion 1270 and its corresponding groove 1280. In other words, as seen in FIG. 8, the magnetic slot wedge 1200 has an asymmetric cross-section about the plane AB that contains the axis of rotation of the rotor and that is also equidistant from the ends of the magnetic slot wedge. Thus, the protrusion 1250 that engages one of the adjacent stator teeth 1210 and the protrusion 1270 that engages the other one of the adjacent stator teeth 1210 is not symmetric about the plane AB.

As illustrated in FIG. 8, the magnetic slot wedge 1200 includes two protrusions 1250, 1270 that are structured to engage the ends of adjacent stator teeth 1210 at different radial positions relative to the axis of rotation of the rotor (not shown) that is contained by the plane AB. Each of the stator teeth 1200 includes a groove 1260, 1280 disposed at the end of the stator tooth, where the grooves are structured to engage one of the two protrusions 1250, 1270.

According to the example embodiment of FIG. 8, the radial position of the groove 1280 relative to the axis of rotation overlaps the radial position of the groove 1260. That is, both the groove 1260 and the groove 1280 are intersected by a single arc that is located at a fixed distance from the axis of rotation. In alternative embodiments, the radial position of the grooves 1260, 1280 is such that no single arc located at a fixed distance from the axis of rotation will intersect both of the grooves. In the first case, the grooves 1260, 1280 may be said to be partially radially offset, in the second case, the grooves 1260, 1280 can be said to be entirely radially offset.

Radially offsetting the grooves 1260, 1280 in the manner described above is advantageous because it may be used to reduce the overall narrowing of the stator teeth 1210 in some or all radial positions, thereby preventing any significant reduction in magnetic flux in the stator teeth or torque. In alternative embodiments, the grooves 1260, 1280 may not be radially offset at all. Obviously, these embodiments could not reduce the narrowing of the stator teeth which is achieved through the embodiments that use radially offset grooves, but these embodiments would still be effective in preventing a reduction in torque.

Figure 9:
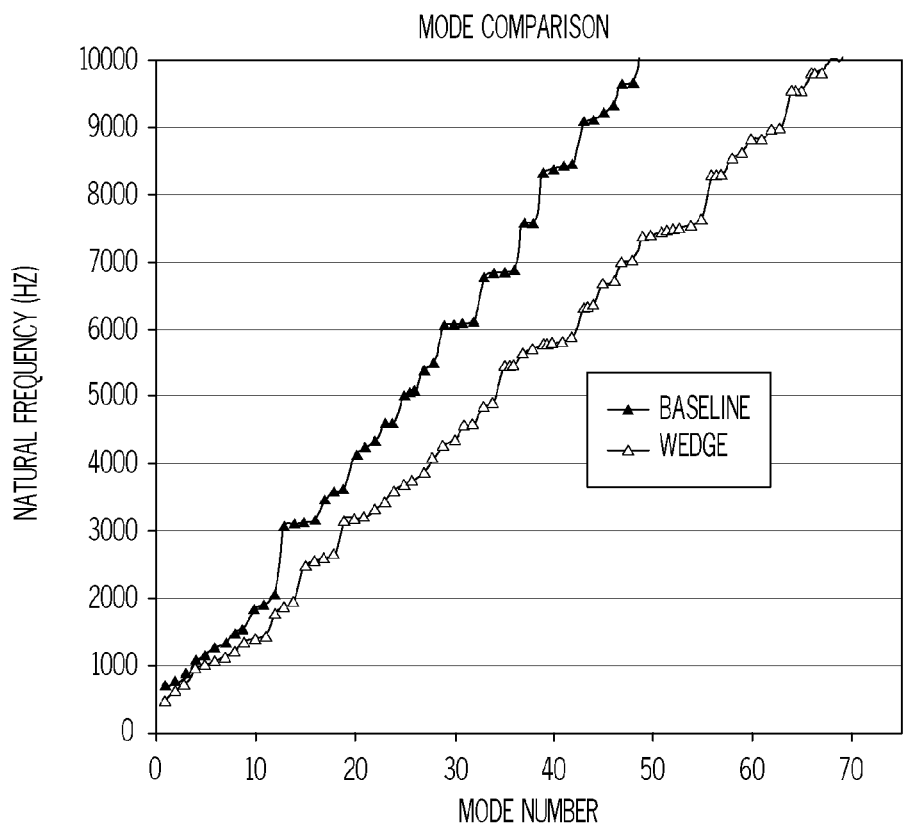
FIG. 9 is a graph that compares the natural frequency of a stator as a function of mode number, for a stator fabricated with magnetic wedges in accordance with the example embodiment and for a conventional fixed-tooth segmented stator without magnetic wedges.

According to the example embodiment, an additional benefit of the magnetic wedges is that they significantly stiffen the stator, which in turn decreases noise and vibration. FIG. 9 is a graph that illustrates the natural frequency of a stator as a function of mode number, for a fixed-tooth stator fabricated with magnetic wedges in accordance with the example embodiment and for a corresponding conventional fixed-tooth segmented stator without magnetic wedges. As shown in FIG. 9, the inclusion of the stator wedge has increased the natural frequency of the stator significantly (top line) relative to the conventional stator (bottom line). As a result of the increased stiffness, machine noise and vibration is reduced.

Another advantage of the example embodiment is that, because the windings in the stator slot are shielded from the magnetic field by the magnetic wedges 870, the eddy current induced in the windings is reduced compared to the conventional designs with no magnetic wedges. Another advantage is that due to the reduction of the slotting effect, the core losses in the stator are also reduced. This is illustrated in FIG. 10, which is a graph of the core loss (in Watts, W) as a function of rotor position for both a conventional fixed tooth stator design and a stator having magnetic wedges in accordance with the example embodiment. The induced eddy currents and core losses arising from the rotation of the machine may collectively be referred to as spin loss.

Figure 11:
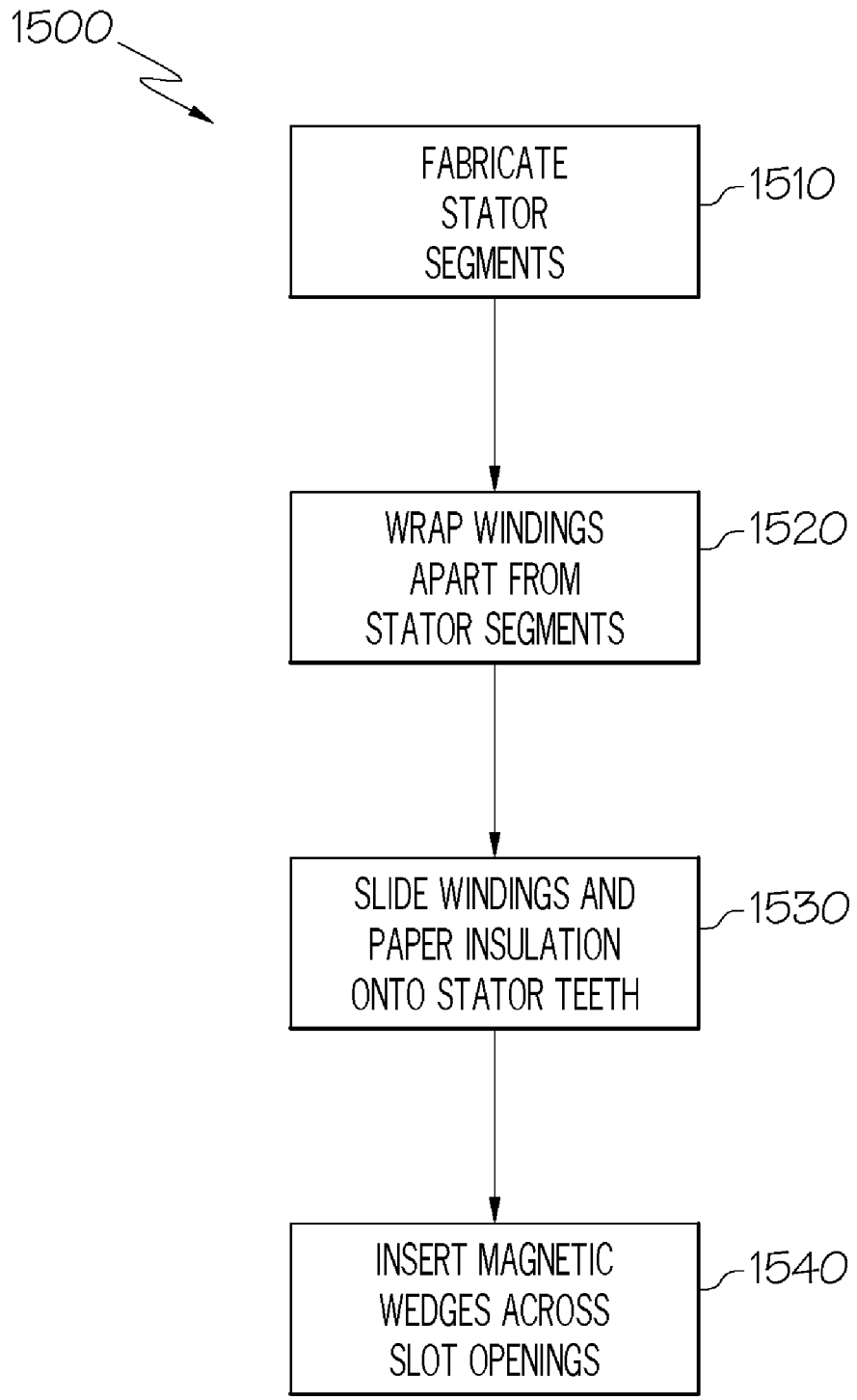
FIG. 11 is a flowchart illustrating some processes included in a method of fabricating a concentrated winding machine according to an example embodiment.

FIG. 11 is a flowchart illustrating some processes included in a method 1500 of fabricating a concentrated winding machine according to an example embodiment. Method 1500 begins with process 1510, with the fabrication of stator segments. Each of the stator segments has at least one stator tooth, but contrary to conventional designs the stator tooth may not have teeth tips. Next, in process 1520, the stator windings for the concentrated winding machine are wound apart from the stator segments, using a bobbin winding method or other method known in the art. In alternative embodiments, process 1520 may occur before process 1510. In process 1530, the stator windings and a relatively thin paper slot liner are positioned over the stator teeth by sliding the windings and the paper slot liner over the end of the tooth. Alternatively, paper insulation may be wrapped around the stator teeth and the winding formed outside may be slid onto the stator teeth, over the paper slot liner. Last, in process 1540, magnetic wedges are inserted across the slot openings between adjacent stator teeth to close the slot openings and to achieve the advantages discussed in the above paragraphs.

According to the example embodiment illustrated in FIG. 11, because the stator teeth do not have teeth tips, the stator windings may be wound apart from the stator teeth and then slid over the ends of the stator teeth along with a relatively thin paper slot liner. This advantageously increases the slot fill factor for the stator relative to the conventional method, such as illustrated in FIG. 2, where a relatively thick plastic slot liner 640 is used. An added advantage is that the thinner paper insulation may be used in conjunction with segmented stator construction, which is stronger than the method of inserting stator teeth into a continuous back ring, as was explained above with regard to FIG. 3. Accordingly, concentrated winding machines manufactured in accordance with example embodiments and achieving improved performance in accordance with example embodiments may be advantageously incorporated into a variety of electro-mechanical systems as will be apparent to those of skill in the art.

Figure 12:
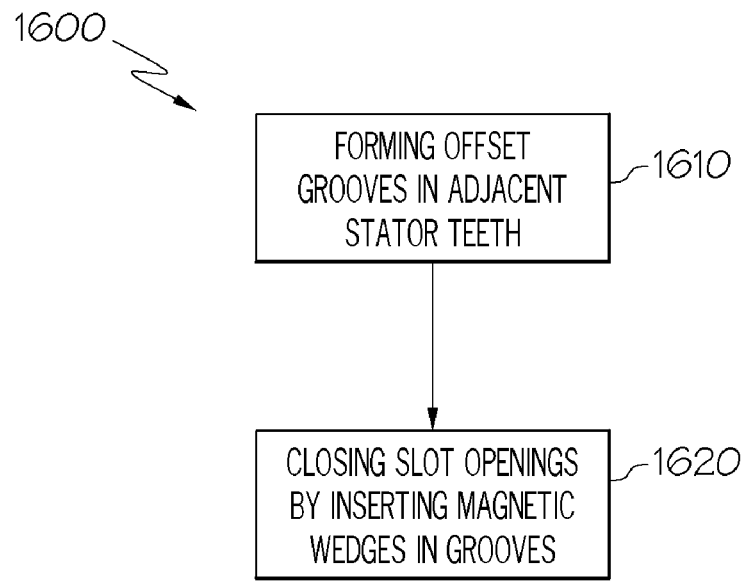
FIG. 12 is a flowchart illustrating some processes included in a method for improving the characteristics of a fixed-tooth stator having stator teeth that define stator slots and slot openings according to an example embodiment.

FIG. 12 is a flowchart illustrating some processes included in a method 1600 for improving the characteristics of a fixed-tooth stator having stator teeth that define stator slots and slot openings according to an example embodiment. Method 1600 begins with process 1610, which is the formation of radially offset grooves in adjacent stator teeth. According to the example embodiment, the grooves are formed proximate to the distal ends of the adjacent stator teeth, but are radially offset from one another. That is, the grooves do not lie at the same distance from a geometric center of the fixed tooth stator. As was explained above, this offset decreases the overall reduction in the width of the stator teeth, which prevents undesirable reductions in flux and torque. In process 1620, the slot openings are closed by inserting magnetic wedges into the grooves, which achieves the advantages that were discussed above.

Figure 13:
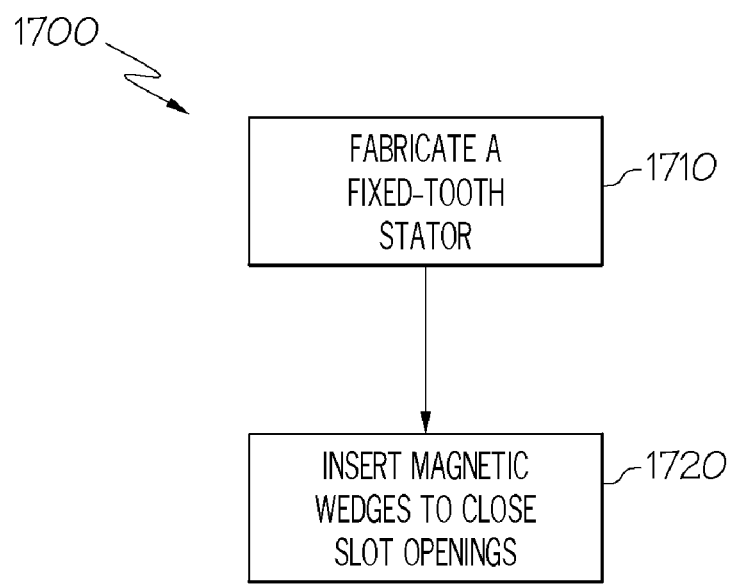
FIG. 13 is a flowchart illustrating some processes included in a method according to an example embodiment.

FIG. 13 is a flowchart illustrating some processes included in a method 1700 according to an example embodiment. The method begins at process 1710, which is the fabrication of a fixed-tooth stator that does not allow for relative movement between adjacent stator teeth. The stator teeth define stator slots and slot openings between adjacent stator teeth. Next, in process 1720, magnetic wedges are inserted between adjacent stator teeth to achieve the advantages discussed above.

In an example embodiment, process 1710 may include assembling the fixed tooth-stator from stator segments, where the stator segments each have at least one stator tooth that is integral to the stator segment. In an example embodiment, process 1710 may include fabricating the stator such that the stator teeth do not have teeth tips.

In an example embodiment, process 1720 may include inserting magnetic wedges that have protrusions to engage a corresponding groove on each one of the adjacent stator teeth. The protrusions may be arranged to engage the corresponding groove at different relative positions on each one of the adjacent stator teeth.

The invention may be practiced in many ways. What follows are descriptions of example, non-limiting embodiments.

According to an example embodiment, a method includes fabricating stator segments having stator teeth that are integral to the stator segment, assembling the stator segments to form a stator that does not allow for relative movement between adjacent stator teeth, the stator teeth forming stator slots between adjacent stator teeth. The method further includes inserting magnetic slot wedges between adjacent stator teeth to close the stator slots.

According to an example embodiment, fabricating the stator segments includes forming a first groove at a distal end of a first stator tooth and forming a second groove at a distal end of a second stator tooth. The first and second grooves may be arranged such that the first and second grooves are radially offset from one another after the stator segments are assembled.

According to an example embodiment, inserting magnetic slot wedges includes inserting a first magnetic slot wedge having a first protrusion and a second protrusion between the first stator tooth and the second stator tooth. The first protrusion engages the first groove and the second protrusion engages the second groove.

According to an example embodiment, a method further includes wrapping a conductive winding around an object to form coils in the conductive winding, and sliding each of the coils over a distal end of a corresponding one of the stator teeth to position each of the coils around the corresponding one of the stator teeth. According to an example embodiment, sliding each of the coils includes sliding each of the coils to achieve a concentrated winding configuration where a positive coil-side and a negative coil-side for the conductive winding are disposed adjacent to one another. According to an example embodiment, the method further includes positioning a paper slot liner over the distal end of the corresponding one of the stator teeth, the paper slot liner insulating each of the coils from the corresponding one of the stator teeth.

According to an example embodiment, a method includes fabricating a magnetic slot wedge that is adapted to be joined to a first stator tooth and a second stator tooth. According to the embodiment, the first and second stator tooth may be part of a fixed-tooth stator that does not allow relative movement between the first stator tooth and the second stator tooth.

According to an example embodiment, fabricating the magnetic slot wedge includes forming a first protrusion on the magnetic slot wedge, the first protrusion adapted to engage a first groove on the first stator tooth. Fabricating the magnetic slot wedge may further include forming a second protrusion on the magnetic slot wedge, the second protrusion adapted to engage a second groove on the second stator tooth. According to an example embodiment, the first protrusion and the second protrusion are arranged such that, when the first protrusion and second protrusion are engaging the first and second grooves, respectively, the first protrusion and the second protrusion are radially offset from one another relative to a geometric center of the fixed-tooth stator. According to an example embodiment, fabricating the magnetic slot wedge includes fabricating the magnetic slot wedge using a material having a permeability that is less than a permeability of a material used to fabricate the first stator tooth and the second stator tooth.

According to an example embodiment, the method may further include forming the first groove in the first stator tooth, and forming the second groove in the second stator tooth. According to an example embodiment, forming the first and second grooves includes cutting the first and second grooves into the first and second stator teeth. According to an example embodiment, the magnetic slot wedge is adapted to close a stator slot between the first stator tooth and the second stator tooth in the fixed-tooth stator.

According to an example embodiment, a method includes fabricating a fixed-tooth stator that has stator teeth with distal ends, the stator teeth defining stator slots and slot openings between adjacent stator teeth, the fixed-tooth stator not allowing for relative movement between adjacent stator teeth. The method further includes inserting magnetic wedges between adjacent stator teeth to close the slot openings.

According to an example embodiment, fabricating the fixed-tooth stator includes assembling the fixed-tooth stator from stator segments, the stator segments each having at least one stator tooth, the at least one stator tooth integral to the stator segment. According to an example embodiment, fabricating the fixed-tooth stator further comprises fabricating the fixed-tooth stator such that the stator teeth do not have teeth tips. According to an example embodiment, fabricating the fixed-tooth stator further includes positioning coils around the stator teeth by sliding the coils over the distal ends of the stator teeth. According to an example embodiment, positioning coils around the stator teeth includes positioning the coils in a concentrated winding pattern such that a positive coil-side of a winding and a negative coil-side of the winding are arranged adjacent to each other.

According to an example embodiment, fabricating the fixed-tooth stator further includes positioning paper slot liners around the stator teeth by sliding the paper slot liners over the distal ends of the stator teeth. According to an example embodiment, inserting magnetic wedges between adjacent stator teeth includes inserting magnetic wedges that have protrusions. Each protrusion may be arranged to engage a corresponding groove on each one of the adjacent stator teeth, and the protrusions may be arranged to engage the corresponding groove at different relative positions on each one of the adjacent stator teeth.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An apparatus comprising:
   stator teeth having distal ends extending from respective stator segments, each stator segment having a radial end, the stator teeth arranged in an annular fashion about an axis to define stator slots between adjacent teeth and slot openings between the distal ends of the adjacent teeth, the stator segments annularly positioned to fixedly contact the radial ends of adjacent stator segments to prevent relative movement between adjacent teeth; and
   magnetic slot wedges structured to be inserted between the distal ends of the adjacent teeth to close the slot openings, wherein the magnetic slot wedges are asymmetric about planes that contain the axis and that lie equidistant between the ends of the corresponding magnetic slot wedge;
   wherein each of the magnetic slot wedges comprises at least two protrusions structured to engage respective grooves in the distal ends of adjacent teeth at different radial positions relative to the axis, and wherein the radial positions of the grooves partially overlap such that they are intersected by a single arc that is located at a fixed distance from the axis.

2. The apparatus of claim 1, the magnetic slot wedges comprising a powdered metal core type material.

3. The apparatus of claim 1, wherein a permeability of the magnetic slot wedges is less than a permeability of the stator teeth.

4. The apparatus of claim 3, wherein the permeability of the magnetic slot wedges is large enough to reduce a reluctance of a magnetic field in the slot openings.

5. A concentrated winding machine comprising:
  stator segments that form an annular stator yoke and stator teeth extending from an edge of the stator yoke to define stator slots between adjacent stator teeth and slot openings at distal ends of the stator teeth; and
  magnetic slot wedges joined to the distal ends of the stator teeth to close the slot openings, each of the magnetic slot wedges including first and second protrusions that are structured to engage corresponding grooves on the distal ends of adjacent stator teeth, wherein the first protrusion is asymmetric relative to the second protrusion and is at a different radial position relative to second protrusion, and wherein the radial positions of the grooves partially overlap such that they are intersected by a single arc that is located a fixed distance from the axis of the stator;
  wherein the stator segments are positioned within the annular stator yoke to fixedly contact adjacent stator segments such that the stator segments and stator teeth form a fixed-tooth stator that does not allow for relative movement between adjacent stator teeth.

6. The concentrated winding machine of claim 5, wherein a permeability of the magnetic slot wedges is less than a permeability of the stator.

7. The concentrated winding machine of claim 6, wherein the permeability of the magnetic slot wedges is great enough to reduce the reluctance of a magnetic field in the slot openings.

8. The concentrated winding machine of claim 5, wherein the first protrusion is asymmetric relative to the second protrusion about a plane that passes midway between adjacent stator teeth.

9. The concentrated winding machine of claim 5, further comprising paper slot liners disposed around the stator teeth.

10. A system comprising:
  a stator having stator segments comprising stator teeth with distal ends, the stator teeth forming stator slots between adjacent stator teeth and slot openings between the distal ends of the adjacent stator teeth, the stator segments positioned within the annular stator yoke to fixedly contact adjacent stator segments; and
  magnetic slot wedges, the magnetic slot wedges attached to distal ends of adjacent stator teeth to close the slot openings, the magnetic slot wedges comprising two protrusions that are structured to engage respective grooves in the distal ends of adjacent stator teeth at different radial positions on the stator teeth;
  wherein the radial positions of the grooves partially overlap such that they are intersected by a single arc that is located a fixed distance from the axis of the stator.

11. The system of claim 10, the stator further comprising stator segments, each of the stator segments including at least one of the stator teeth.

12. The system of claim 11, further comprising conductive windings wound about the stator teeth and occupying the stator slots, the conductive windings arranged such that a positive and a negative pole for each conductive winding are adjacent to each other.

13. The system of claim 12, further comprising paper slot liners disposed between the conductive windings and the stator teeth, the paper slot liners structured to be positioned on the stator teeth by sliding them over the distal ends of the stator teeth.

14. The system of claim 10, wherein the magnetic slot wedges comprise a first material having a first permeability, wherein the stator teeth comprise a second material having a second permeability, and wherein the first permeability is less than the second permeability.

15. The system of claim 10, each of the stator teeth comprising two grooves arranged on opposite sides of the stator tooth, each of the two grooves structured to engage one of the two protrusions on two different magnetic slot wedges, the two grooves offset on the stator tooth such that an overall reduction in a width of the stator tooth at any radial position is no greater than a depth of one of the two grooves.

* * * * *